No. 659,500. Patented Oct. 9, 1900.
R. WALES.
FASTENING DEVICE.
(Application filed Aug. 4, 1900.)

(No Model.)

WITNESSES:
Ella L. Giles
Otto Munk

INVENTOR
Robert Wales
BY
Richards
ATTORNEYS

UNITED STATES PATENT OFFICE.

ROBERT WALES, OF INVERCARGILL, NEW ZEALAND.

FASTENING DEVICE.

SPECIFICATION forming part of Letters Patent No. 659,500, dated October 9, 1900.

Application filed August 4, 1900. Serial No. 25,934. (No model.)

*To all whom it may concern:*

Be it known that I, ROBERT WALES, a subject of the Queen of Great Britain, residing at Invercargill, Otago, in the Colony of New Zealand, have invented a new and useful Improved Fastening Device; and I do hereby declare the following to be a full, clear, and exact description of the same.

This invention provides an improved device for fastening waistbands and dresses, the ends of boot-laces to boots, shirt-collars to shirt-neckbands, and which may also be used for a large number of analogous purposes.

It consists of an S-shaped frame, in one curve of which is pivoted a clip in the shape of the letter U. A hooked lever pivoted upon the end of the frame has a cam designed to engage with the upper part of one arm of the U-clip and to operate it, whereby material or an object placed between one or both of the arms of the U-clip and the frame is securely held.

My invention will be more clearly understood by reference to the annexed drawings, wherein—

Figure 1:
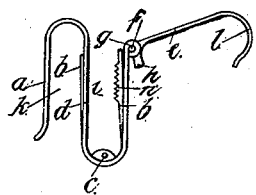
Figure 2:
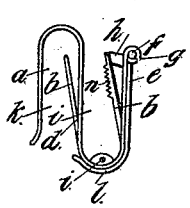
Figure 3:
Figure 4:
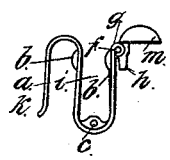
Figure 5:

Figure 1 is a side elevation showing the device open; Fig. 2, a similar view showing the device closed; Fig. 3, a plan of Fig. 1. Figs. 4 and 5 are side elevations illustrating the device as employed for fastening a collar to a shirt-band, Fig. 4 showing the device open and Fig. 5 closed Similar letters indicate the same parts throughout the figures.

In Figs. 1 to 3 the frame $a$ is formed of wire bent into S shape, as shown. A U-shaped piece $b$ is formed to correspond in shape to one part of the frame $a$, upon which it is pivoted by a pin $c$, passing through a hole in the center of the curved portion of the piece, and ears upon the corresponding part of frame $a$. Frame $a$ is made of doubled wire, which is bent apart in the portion $d$ to provide an opening for reception of piece $b$. One extremity of frame $a$ has pivoted upon it the lever $e$ by a pin $f$, passing through the lever and through eyes $g$, formed by bending the ends of the wire of the frame. A cam $h$, fixed upon the lever and approximately at right angles thereto, is arranged to engage with the upper end of one arm of the U-piece $b$, the clip being thereby vibrated upon its pivot and any object in the openings $i\ k$ of the frame being clamped between the piece and the frame. One arm of the piece is shown serrated to provide a better grip upon the material or object being fastened. The end of lever $e$ has a hook $l$, designed to fit tightly over the curved portion of the frame $a$ when the fastening is closed.

In Figs. 4 and 5 the fastening is shown adapted for securing a collar to a shirt-band, the hooked lever being for the sake of appearance substituted by a pivoted stud $m$, to which the cam $h$ is fastened and which has the same function as the lever.

The frame may, if preferred, be constructed of flat or ribbon metal, suitable slots being cut for the operation of the clip.

What I do claim as my invention, and desire to secure by Letters Patent, is—

A fastening device consisting of an S-shaped frame and a U-shaped piece of the shape of one portion of the frame to which it is pivoted, a lever pivoted upon the frame having a cam, arranged when said lever is operated to engage with and vibrate the piece upon its pivot, whereby objects placed in position are clamped between the arms of the piece and the frame, substantially as specified and illustrated.

In testimony whereof I have signed this specification in the presence of two subscribing witnesses.

ROBERT WALES.

Witnesses:
 HENRY YOUNG,
 J. R. PARK.